United States Patent [19]

Hamilton et al.

[11] Patent Number: 5,486,010
[45] Date of Patent: Jan. 23, 1996

[54] GASKET MATERIAL FOR USE IN PLATE AND FRAME APPARATUS AND METHOD FOR MAKING AND USING SAME

[75] Inventors: Elizabeth M. Hamilton; Eric W. Lalli, both of Elkton; Cindy B. Lubin, Towson; Wanda F. Sparks; Alfred F. Waterland, III, both of Elkton, all of Md.

[73] Assignee: W. L. Gore & Associates, Inc., Newark, Del.

[21] Appl. No.: 118,372

[22] Filed: Sep. 8, 1993

Related U.S. Application Data

[63] Continuation-in-part of Ser. No. 50,903, Apr. 20, 1993.
[51] Int. Cl.⁶ ................................................. F16J 15/10
[52] U.S. Cl. ............................ 277/1; 277/22; 277/227; 277/229
[58] Field of Search ....................... 277/1, 22, 227, 277/229; 165/166, 167

[56] References Cited

U.S. PATENT DOCUMENTS

| | | | |
|---|---|---|---|
| 3,393,504 | 7/1968 | Dodge, Jr. | 57/144 |
| 3,756,004 | 9/1973 | Gore | 51/11 |
| 3,953,566 | 4/1976 | Gore | 264/288 |
| 4,576,861 | 3/1986 | Kato | 428/316.6 |
| 4,635,715 | 1/1987 | Andersson | 165/167 |
| 4,743,421 | 5/1988 | McDowell et al. | 264/129 |
| 4,848,451 | 7/1989 | Jonsson et al. | 165/167 |
| 4,854,382 | 8/1989 | Funke | 165/167 |
| 4,872,506 | 10/1989 | Nilsson et al. | 277/227 X |
| 4,898,638 | 2/1990 | Lugez | 156/272.6 |
| 4,905,758 | 3/1990 | Mathur et al. | 165/167 X |
| 5,112,664 | 5/1992 | Waterland, III | 428/76 |
| 5,160,773 | 11/1992 | Sassa | 428/76 |
| 5,193,612 | 3/1993 | Stirnkorb | 165/167 |

FOREIGN PATENT DOCUMENTS

| | | |
|---|---|---|
| 0159942 | 10/1985 | European Pat. Off. . |
| 0304141 | 2/1989 | European Pat. Off. . |
| 0415140 | 3/1991 | European Pat. Off. . |
| 47-62658 | 6/1972 | Japan . |
| 49-75565 | 7/1974 | Japan . |
| 55-072950 | 6/1980 | Japan . |
| 57-051450 | 3/1982 | Japan . |
| 59-115828 | 7/1984 | Japan . |
| 4331876 | 11/1992 | Japan . |
| 5099343 | 4/1993 | Japan . |
| 5203383 | 8/1993 | Japan ........................ 165/167 |
| 0842962 | 8/1960 | United Kingdom ................ 165/166 |
| 9104847 | 4/1991 | WIPO . |
| 9208916 | 5/1992 | WIPO . |
| 9304227 | 3/1993 | WIPO . |

OTHER PUBLICATIONS

Intertex Valve Stem Packing Literature, Inertech Supply, Inc. No Date.
Gore–Tex® Valve Stem Packing, W. L. Gore & Associates, Inc. No Date.
Literature: APV Model HXCB Paraglow Plate Heath Exchanger; 6 page 5; APV Crepaco, Inc.; May 1985.
Literature; Mueller® Accu–Therm® Plate Heat Exchangers; no date.

*Primary Examiner*—Thomas B. Will
*Assistant Examiner*—John L. Beres
*Attorney, Agent, or Firm*—David J. Johns

[57] ABSTRACT

Improved material and method for use in sealing plate and frame apparatus, such as a plate and frame heat exchanger, are provided. The gasket material comprises a core of elongated polytetrafluoroethylene (PTFE) contained within a tight wrap of high strength film. The gasket material has the exceptional operational properties of PTFE, while being resistant to cold flow or "creep" which distorts most PTFE seals under heavy unconfined compression. The preferred material is pre-compressed to aid in installation.

40 Claims, 3 Drawing Sheets

GASKET MATERIAL FOR USE IN PLATE AND FRAME APPARATUS AND METHOD FOR MAKING AND USING SAME

RELATED APPLICATIONS

The present application is a continuation-in-part of copending U.S. patent application Ser. No. 050,903, filed Apr. 20, 1993.

BACKGROUND OF THE INVENTION

1. Field of the Invention

The present invention relates gasket and seal materials, and especially gasket materials for use in sealing multiple layers of an apparatus together to contain fluid flow therethrough, such as in a plate and frame heat exchange or filter apparatus.

2. Description of Related Art

In order to maximize fluid flow though a filter or heat exchange apparatus, multiple functional plates are often stacked in series. In the case of a filter, the functional plates comprise filter elements; in the case of heat exchange apparatus, the plates comprise thin (e.g. 0.6 to 1.0 mm) thermally conductive material, such as stainless steel. In either instance, a fluid seal must be established and maintained between each of the plates to assure that leakage does not occur around plates.

A plate and frame heat exchanger uses a large number of plates, often ranging from 8–16 to 500 or more plates in a single unit, to provide a mechanism for heat transfer. Generally, each of the plates comprises an essentially rectangular element with upper and lower ports therein. When the plates are stacked with their faces parallel to each other and sealed along their edges, cells are created with fluid flow directed through each of the cells, across the face of the plates, from an upper port to a lower port or visa versa.

Heat exchange is accomplished by stacking many plates in this manner and establishing two distinct fluid paths through the heat exchanger. A first path passes up and down the faces of the plates in every other cell (e.g. passing from left to right in the apparatus through the first, third, fifth, etc. cells); and an counter-current second fluid path passes down and up the plates in the alternating cells (e.g. passing from right to left in the apparatus through the sixth, fourth, second cells).

The most important feature of any heat exchanger is its successful ability to segregate and contain the fluids passing through it. Clearly leakage or, worse, intermixing of fluids in the exchanger compromises or completely destroys its proper function. Moreover, where hazardous chemicals are handled by such a system, any leakage can be disastrous. As a result, particular attention is given to providing effective seals between each of the plates of a heat exchanger.

A typical heat exchanger seal comprises a ring of elastomer (e.g. butyl rubber, neoprene, ethylenepropylene diene monomer (EPDM), etc.) or compressed sheet (e.g. asbestos or synthetic fiber) that is mounted around the periphery of each plate and around appropriate ports to assure proper fluid separation and orientation. These gaskets are generally glued in place on the plate and then the plates are stacked within a frame and torqued down until a tight fit is created between each of the plates and the intermediate gaskets.

Existing plate and frame gaskets have many serious drawbacks. For instance, a sometimes difficult compromise must be struck between a material which provides a tight seal and a material which is adequately durable and chemical/heat resistant for long-term use. Another common problem is that the gasket material is required to conform to compensate for misaligned, bent, scored, or otherwise defective plates.

One of the most serious problems with existing plate and frame gasket materials is that many materials (e.g. asbestos or elastomer glued in place with an epoxy or other adhesive) are extremely difficult to remove and replace during routine maintenance. For example, it is estimated that 1 to 1.25 man-hours are required for the reconditioning of each plate in a medium size heat exchanger employing elastomeric gasket material. For a heat exchanger with over 100 plates, reconditioning of the entire heat exchanger is clearly a massive undertaking. Additionally, materials such as EPDM, neoprene, or butyl rubber can have a relatively short operative life of only 6 to 9 months in harsh environments (e.g. when subjected to excessive chemical or thermal attack).

Complicating both the installation and reconditioning of heat exchanger gaskets is the use of texturing on the plates normally employed in these systems. As is known, by corrugating or otherwise texturing a heat exchanger plate, its surface area is significantly increased, thus improving its ability to transmit heat. Further, plate texturing also makes it quite difficult to remove broken gasket material which can become stuck in the plate's ridges.

Another complicating factor in sealing many plate and frame apparatus is that the plates are often poorly supported within the frames. "Non-optimum" plate and frame apparatus support the plates through use of an ill-fitted connection between the plates and guide rails. As a result, the plates must be carefully torqued down to assure that proper alignment is maintained between the plates.

A better system is offered in so-called "optimum" plate and frame apparatus that use closely matched guide rails to help keep the plates aligned during the installation procedure. Such alignment is considered critical where significant compression must occur during installation. Despite this improvement, care must still be maintained to assure that the plates are evenly mounted.

It is important that the plates are kept in contact with each other during service. Such contact is important for increasing heat transfer along the corrugations, as well as compensating for different pressures between plates and cyclic pumping actions which can lead to flexing of the plates and mechanical fatigue. In this regard, the proper placement and maintenance of the gasket material is crucial. The gasket material must supply enough counterforce to seal between the plates during installation; additionally, the gasket material cannot cold flow or "creep" away from the contacting plates by further thinning and widening during use—which could lead to gaps and leakage.

One material that has superior heat and chemical resistant properties is polytetrafluoroethylene (PTFE)As a gasket, PTFE has exhibited utility as a material for use in harsh chemical environments which normally degrade many conventional metals and polymeric materials. PTFE has a usable temperature range from as high as 260° C. to as low as near −273° C.

However, conventional non-porous PTFE gasket materials which have been compression molded or extruded and then heated to a temperature above 345° C. exhibit poor mechanical properties, such as low tensile strength and low cold flow resistance. This limits the use of such materials in areas requiring a measure of physical strength and resistance to creep.

PTFE may be produced in an expanded porous form as taught in U.S. Pat. No. 3,953,566 issued Apr. 27, 1976, to Gore. Expanded polytetrafluoroethylene (ePTFE) is of a higher strength than conventional PTFE, has the chemical inertness of conventional PTFE, and has an increased temperature range of up to 315° C. in service. An example of a porous expanded PTFE gasket material is available from W. L. Gore & Associates, Inc., of Elkton, Md., under the trademark GORE-TEX® Joint Sealant.

Porous ePTFE joint sealants have proven to have excellent seals in many applications. Unfortunately, due to the inherent compression characteristics of this material, it generally requires a relatively wide sealing surface and a significant clamping load to provide a tight and stable seal between abutting surfaces (i.e. whereby a wide, thin, fully densified gasket can be created). As a result, ePTFE does not perform well in instances with narrow sealing surfaces or requiring relatively thick gasket materials since under compression creep can occur over time to distort the gasket's proper placement. This is a serious constraint in attempting to use this material in the relatively thick-gasketed but high-compression environment of a plate and frame apparatus.

For some applications the problem of creep has been addressed by providing an expanded PTFE core wrapped by a tape of porous ePTFE. Commercial embodiments of such material are available from W. L. Gore & Associates, Inc., under the designation GORE-TEX® Valve Stem Packing, and Inertech, Inc., of Monterey Park, Calif., under the designation INERTECH® Valve Stem Packing. These materials are suitable for use as a compression packing where they are confined within a defined volume. However, when used as a gasket in an unconfined volume under a compressive load, these materials exhibit undesirable creep characteristics (i.e. continuing to thin and widen) over time, making them completely unsuitable for use as gasket material in most plate and frame apparatus.

As is demonstrated by U.S. Pat. No. 5,160,773 issued Nov. 3, 1992, to Sassa, very successful use of a coated expanded PTFE seal can be achieved in low compression applications, such as in a "wiper" seal for moving surfaces with very low clamping forces and low fluid pressures. In that case, the sealing material comprises a PTFE felt encapsulated by a porous PTFE sheet laminated to a melt-processible thermoplastic fluoropolymer. Regretfully, where significant compression forces are applied, deformation and undesirable creep is again experienced.

One suggestion for achieving the chemical resistance of PTFE but limiting the amount of creep of the material is to coat a generally creep-stable material such as synthetic rubber with a coating of PTFE to provide chemical resistance. One example of such a structure is presented in U.S. Pat. No. 4,898,638 issued Feb. 6, 1990, to Lugez. In this patent it is taught that through a disclosed process one or more films of only partially porous PTFE can be adhered to a rubber sheet to provide a gasket material with chemical resistance. While this approach may address some of the problems with existing plate and frame gasket materials, the PTFE film can crack under the stresses of compression, leading to exposure and failure of the core elastomer. Further, it is believed that longer life and better thermal and chemical resistivity are possible if an expanded PTFE material is employed throughout the gasket.

As is disclosed in co-pending U.S. patent application Ser. No. 050,903, filed Apr. 20, 1993, it has been determined that a PTFE sealing material can be produced with limited long-term creep by wrapping a core of elongated or expanded PTFE with a high strength film of expanded PTFE. The high strength film is resistant to deformation and stretching and serves to contain the PTFE core in place within a compressed gasket. This material has proven to be quite effective in sealing plate and frame heat exchangers—providing thermal and chemical protection, long-life and durability, and ease in replacement.

Despite the success of the above described material in sealing plate and frame heat exchangers, it has a number of deficiencies. Perhaps the greatest problem with the high strength film wrapped PTFE material is that it requires extensive compression before becoming properly seated within a plate and frame apparatus. A typical gasket material with a rectangular cross-section generally must be compressed in height down about 3:1 before proper seating and sealing is established.

This seating problem is a very serious concern in an application with many plates since a normal corresponding frame is simply too small to contain all the plates and un-condensed gasket material at one time. As a result, an installer must go through the burdensome and time consuming procedure of installing and compacting the plates and gasket materials in a number of batches. This problem is vastly compounded in non-optimal plate and frame apparatus where a large degree of movement of the plates in the sealing process leaves too much room for plate distortion and gasket shifting.

Accordingly, it is a primary purpose of the present invention to provide a gasket material for a plate and frame apparatus that provides an effective long-term seal under pressure, while being durable, chemical and thermal resistant, non-contaminating, and relatively easy to install.

It is another purpose of the present invention to provide a gasket material for plate and frame apparatus that is readily removed and replaced with minimal labor and expense.

It is still another purpose of the present invention to provide a gasket material for plate and frame apparatus that provides the benefits of expanded PTFE material, while avoiding the problem of creep.

It is yet another purpose of the present invention to provide a gasket material for plate and frame apparatus that can be readily installed without requiring undue torque or plate movement.

It is a further purpose of the present invention to provide a method for making and optimally using a gasket material with the above properties.

These and other purposes of the present invention will become evident from review of the following specification.

SUMMARY OF THE INVENTION

The present invention is an improved gasket material for use in a variety of plate and frame apparatus, such as plate and frame heat exchangers and filter units. The basic material of the present invention comprises a core of elongated polytetrafluoroethylene (PTFE) tightly wrapped in a high strength film. When placed under high compression in a plate and frame apparatus, the gasket material of the present invention has proven to be highly resistant to cold flow or "creep," while providing all the exceptional properties of PTFE material.

The preferred gasket material of the present invention comprises an expanded PTFE core wrapped in a high strength PTFE film and then pre-compressed to vastly reduce the time and effort required to install the gasket material in a plate and frame apparatus. Ideally, to aid in installation, the pre-compressed gasket material includes a pattern or "footprint" which matches the texture of an adjoining plate from the plate and frame device. The inclusion of a conformable layer, such as a soft PTFE tape, on the pre-compressed gasket further assists in establishing an improved initial seal in the plate and frame device.

The gasket material of the present invention has numerous benefits over previous plate and frame sealing material. Among the improvements are longer life and greater durability in environments of harsh chemicals and/or extreme temperatures. In addition, even after an extended period of high compression, the gasket material of the present invention releases very readily from a plate, usually completely intact. This greatly improves plate reconditioning time and effort.

DESCRIPTION OF THE DRAWINGS

The operation of the present invention should become apparent from the following description when considered in conjunction with the accompanying drawings, in which.

DETAILED DESCRIPTION OF THE INVENTION

The present invention is a gasket material suitable for use in a variety of applications, and especially in applications requiring minimal cold flow or "creep." Of particular interest are plate and frame apparatus (e.g. plate and frame filters or heat exchangers) where multiple elements must be stacked together and then compressed.

Figure 1:
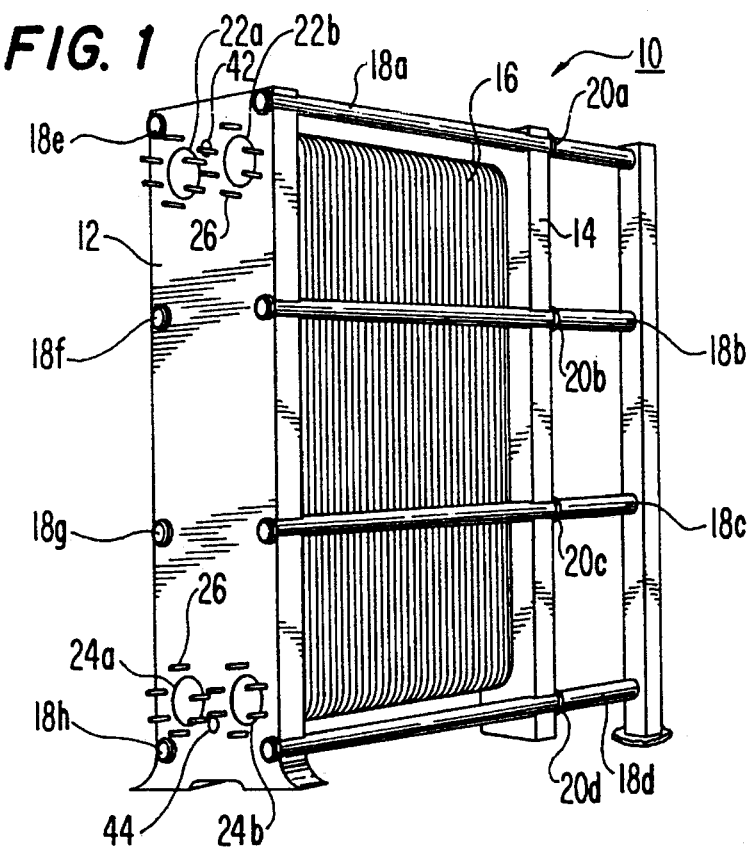
FIG. 1 is a three-quarter perspective view of a conventional plate and frame heat exchanger.

Shown in FIG. 1 is a conventional plate and frame heat exchanger 10. The heat exchanger 10 comprises a fixed end frame 12, a movable end frame 14, multiple plates 16 mounted between the two end frames 12, 14, compression bolts 18a, 18b, 18c, 18d, 18e, 18f, 18g, 18h spanning between the two end frames 12, 14, and compression nuts 20a, 20b, 20c, 20d holding the moveable end frame 14 in tight contact with the plates 16.

In order to establish gas or liquid fluid flow through the heat exchanger 10, upper ports 22a, 22b and lower ports 24a, 24b are provided in the end plates 12, 14 corresponding to ports in each of the plates 16. Threaded studs 26 are provided around each of the ports 22, 24 to accommodate fluid line attachments (not shown).

Figure 2:
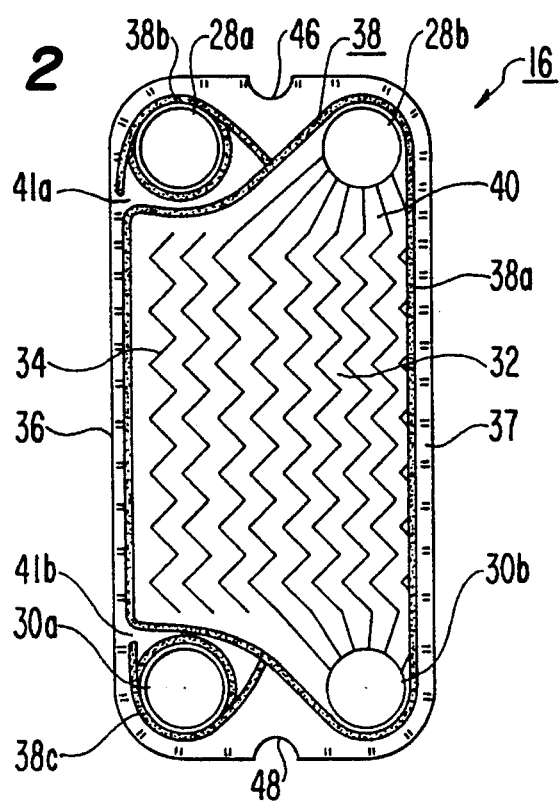
FIG. 2 is an elevational view of a conventional plate from a plate and frame heat exchanger with a gasket material of the present invention mounted thereon.

Shown in FIG. 2 is a representative heat exchanger plate 16 for use in a heat exchanger. As has been noted, the plate includes upper ports 28a, 28b and lower ports 30a, 30b corresponding to ports 22, 24 in heat exchanger 10. In order to increase contact area between the plate and fluid flowing over its surface 32, a series of corrugations 34 or other texturing is provided. The plate's edge 36 is likewise corrugated with a groove 37 typically provided for attachment of a gasket material 38. In addition to increasing surface area, as has been explained, the corrugations contact one another to help support the plates in order to resist plate fatigue and improve mechanical integrity of the unit.

Since these types of plates come in a very wide variety of sizes, shapes and textured patterns, it should be understood that considerable customizing of gasket material may have to be performed to fit gaskets to different models of plate and frame devices. Fortunately, as will be evident from the following description, the gasket material of the present invention is fully adaptable to such customizing.

Gasket material 38 of the present invention is installed on the plate to establish a fluid flow path across it. In the embodiment shown, when this plate is attached against an identical plate an outer perimeter gasket 38a forms a cell 40 communicating fluid flow between upper port 28b and lower port 30b. Fluid flow will pass between the surfaces of the two plates through various channels created between corresponding corrugations 34 in the two plates.

Gasket material 38b, 38c is also installed around ports 28a and 30a to direct alternate (i.e. countercurrent) fluid flow pass this plate into a fluid flow path established across the next plate stacked in series. The gasket material 38b, 38c around ports 28a, 30a serve to assure that fluid leakage does not occur from the heat exchanger and that fluid does not intermix with the fluid in cell 40. As a further assurance against fluid mixture, each of the port gaskets 28a, 30a includes a vent 41a, 41b to allow release of fluid to the atmosphere and away from cell 40 in the case of some failure in either port gasket 38b or 38c.

In operation, the gasket material 38 is installed on each of the plates 16 to create two distinct fluid paths through the heat exchanger 10. By way of example, a first path passes up and down the faces of the plates in every other cell (e.g. passing from upper port 22b left to right through the apparatus through every other cell (e.g. odd numbered cells) and out a lower port (not shown) in the moveable end plate 14); and an counter-current second fluid path passes down and up the plates in the alternating cells (e.g. passing from an upper port (not shown) in the moveable end plate 14 right to left in the apparatus through the alternative cells (e.g. even number cells) and out lower port 24a).

Once the gasket material 38 has been correctly positioned in this manner on each of the plates 16, the plates are stacked in series and mounted between the frames 12, 14. In the apparatus shown, the heat exchanger has been provided with guide rails 42, 44 running the length of the apparatus. Slots 46, 48 are provided in each of the plates 16 corresponding to these rails 42, 44. By aligning the slots in the plates along the guide rails such that lateral movement of the plates is not feasible, "optimal" alignment of the plates is assured during installation and use.

In order to establish a tight seal between the plates, once they are aligned between the frame ends 12, 14 in the manner described, each of the compression nuts 20 are tightened down along compression bolts 18. Care must be exercised to assure that the plates are evenly torqued down in this manner, with a limited amount of torque applied to any one bolt at a time.

Figure 3:
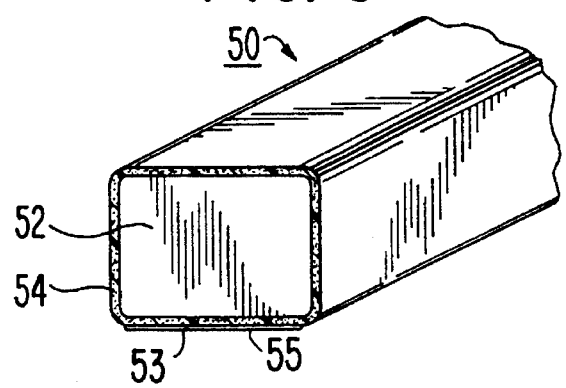
FIG. 3 is a three-quarter isometric view of an uncompressed gasket material of the present invention.

One embodiment of the gasket material 50 of the present invention is shown in FIG. 3. This material comprises a core 52 of elongated, or preferably porous expanded, polytetrafluoroethylene (PTFE) tightly wrapped in a high strength film 54, such as a highly oriented film of expanded PTFE. It has been determined that the high strength film wrap serves to contain the PTFE core and prevent it from creeping even when placed under extensive compression and heat cycling. The goal here is to prevent substantial lateral flow of the PTFE core under stress. In this manner a desired height-to-width ratio in the compressed gasket is maintained such that compressive force continues to be shared between the plates and the gasket material and is not relieved from the gasket.

Preferably, the core material is prepared by paste extrusion of PTFE fine powder to form a rod or beading by methods and equipment known in the art. The paste extruded rod or beading is then expanded to form a flexible porous structure of nodes interconnected by fibrils by stretching it according to the process taught in U.S. Pat. No. 3,953,566 to Gore. The paste extruded PTFE rod or beading is stretched in the longitudinal direction an amount in the range 2:1 to 25:1, preferably an amount in the range 3:1 to 12:1, depending on the strength and compressibility properties desired in the core material.

Prior to wrapping, the elongated porous PTFE core material 52 has a surface shape that permits the film 54 to be wrapped in continuous contact with the surface of the core material. For use as a gasket in a plate and frame apparatus, preferably, the elongated porous PTFE core material 52 is wrapped in a circular cross-section and then the wrapped material is molded to establish a rectangular cross-section for installation. Alternatively, the core may also be wrapped in virtually any shape having no recessed surfaces (e.g. rectangular, oval, square, triangular, etc.). More complex shapes, e.g., surfaces with depressions or projections, can be formed after the core material has been wrapped.

The elongated PTFE core may contain a particulate filler. The term "particulate" is meant to include particles of any aspect ratio and thus includes particles, chopped fibers, whiskers, and the like. The particulate filler may be an inorganic filler which includes metals, semi-metals, metal oxides, carbon, graphite, and glass. Alternatively, the particulate filler may be an organic filler, which includes polymeric resins. Suitable resins include, for example, polyether ether ketone (PEEK), fluorinated ethylene propylene (FEP), copolymer of tetrafluoroethylene and perfluoro(propylvinyl ether)(PFA), and other similar high melting polymers.

Particulate fillers, when used, are selected to impart or enhance certain properties in the core or wrapping film according to the application in which the composite gasket material of the invention will be used. For example, they can be used to impart or enhance properties such as electrical conductivity and thermal conductivity, and can also be used to modify compressibility and dimensional stability properties of the composite gasket material. Particulate fillers can be used in concentrations as high as 90 volume percent, but are more generally used in the concentration range 10–70 volume percent.

The particulate filler and PTFE fine powder may be combined using conventional dry mixing methods after which they can be formed to provide the core material of the invention by the process taught in U.S. Pat. No. 3,953,566 to Gore. Alternatively, the particulate filler may be mixed with PTFE in aqueous dispersion and coagulated together to form a wet mixture of solids. The water is removed from the mixture by standard drying methods and the mixture further processed in the same manner as dry mixed materials.

The high strength film 54 is preferably a porous expanded PTFE film as produced by the process taught in U.S. Pat. No. 3,953,566 to Gore. By stretching a paste-formed PTFE sheet in one or more directions, a porous expanded polytetrafluoroethylene film having high strength is produced. The high strength porous PTFE film may be made by stretching uniaxially, either in longitudinal or transverse direction; or biaxially, in both longitudinal and transverse directions, sequentially or simultaneously. The film is preferably uniaxially stretched in the longitudinal direction an amount in the range 2:1 to 150:1, more preferably an amount in the range 2:1 to 80:1.

Longitudinal direction as used herein indicates the planar direction of manufacture of the film; transverse direction indicates the planar direction normal to the direction of manufacture.

For most plate and frame applications, the preferred core comprises an expanded PTFE with a density of 1.1 g/cc (within a range of 0.9 to 1.2 g/cc) after being wrapped and shaped, which has general pre-installed dimensions of about 7.6–8.9 mm by 10.2–12.7 mm in cross section. For this use, a dual film layer is used comprising an inner film and an outer film coaxially wrapped around the core. Prior to installation on the core, the preferred inner film is about 2 mil thick and about 1 inch wide, and has a tensile strength of 212.7 MPa and a modulus of elasticity at 2% strain of about 7212 MPa; the preferred outer film is about 6 mil thick and 1.5 inches wide, and has a tensile strength of about 19.9 MPa and a modulus of elasticity at 2% strain of about 590 MPa.

To assist in retaining this gasket material in place once installed, it is preferred that a thin coating of adhesive 53 be applied to the gasket material and/or the groove 37 in the plate. The ideal adhesive comprises a composite adhesive material comprising a pressure sensitive adhesive layer (e.g. rubber or acrylic) applied to either side of a woven or non-woven carrier sheet 55 (e.g. MYLAR® polyester). The choice of adhesive is application specific and depends upon the chemical and temperature conditions under which the gasket is to be employed. The adhesive should have good holding properties against both expanded PTFE and metal or plastic.

Additionally, it is very desirable that the adhesive be easily removed from the plate for reconditioning of the plate. For example, an adhesive layer of styrene-butadiene rubber (SBR) on both sides of a MYLAR polyester carrier sheet can be quickly removed from the plate by merely pulling on the carrier sheet. Any adhesive residue can be wiped off the plate with a solvent such as acetone or rubbing alcohol.

Ideally, the high strength PTFE film 54 is a composite film comprising a high strength porous expanded PTFE film adhered to a thin layer of melt-processible thermoplastic fluoropolymer. By thin is meant a thickness of 30 micrometers or less, preferably 20 micrometers or less, and more preferably 10 micrometers or less. The expanded layered composite film is produced in the following manner.

PTFE fine powder, which may be combined with the same particulate filler materials and prepared as described above, is mixed with a hydrocarbon extrusion aid, usually an odorless mineral spirit, to form a paste. The paste is compressed into a billet and subsequently extruded through a die in a ram-type extruder to form a coherent planar sheet. The coherent PTFE sheet, with or without particulate filler materials, is optionally calendered and then dried by volatilizing the hydrocarbon extrusion aid with heat. Evaporation of the hydrocarbon extrusion aid results in the PTFE sheet having a small degree of porosity. The resulting porous PTFE sheet is now ready to be combined with a melt-processible thermoplastic fluoropolymer film and the combined sheets expanded together. However, if a highly porous expanded PTFE film is desired, the porous PTFE sheet may be preliminarily expanded by stretching it at 200°–300° C. about 1.5 to 5 times its original length prior to combining it with the melt-processible thermoplastic fluoropolymer.

The porous PTFE sheet is combined with the melt-processible thermoplastic fluoropolymer film by placing the melt-processible film on the porous PTFE sheet and heating the combination to a temperature between the melt point of the melt-processible fluoropolymer and 365° C. The porous PTFE sheet is kept under tension when heated thereby maintaining its dimensions while the melt-processible fluoropolymer layer is combined with it. As the porous PTFE sheet is heated to a temperature above the melt point of the melt-processible fluoropolymer layer, the melt-processible fluoropolymer layer in contact with the porous PTFE sheet at least partially melts and flows onto the surface of the porous PTFE sheet thereby forming a composite precursor, i.e., a coated porous PTFE sheet ready to be expanded.

The coated porous PTFE sheet may be expanded according to the method taught in U.S. Pat. No. 3,953,566 to Gore. The temperature range at which expansion of the coated porous PTFE sheet is performed is between a temperature at or above the melt point of the melt-processible thermoplastic fluoropolymer layer and a temperature at or below the melt point of PTFE. The coated porous PTFE sheet may be stretched uniaxially, either in a longitudinal or transverse direction; or biaxially, in both longitudinal and transverse directions, sequentially or simultaneously. It may be stretched in one or more steps.

The coated porous PTFE sheet forms a porous expanded PTFE film as it is stretched. The expanded PTFE film is characterized by a series of nodes interconnected by fibrils. As the coated porous PTFE sheet is expanded to form the high strength porous expanded PTFE film, the melt-processible thermoplastic fluoropolymer layer adhered to it is carried along the surface of the expanding sheet while in a melted state, thereby becoming progressively thinner and forming a thin melt-processible thermoplastic fluoropolymer layer on the porous expanded PTFE sheet. The thin melt-processible fluoropolymer layer has a thickness of 30 micrometers or less. The thin melt-processible fluoropolymer layer preferably has a thickness of one half, more preferably one tenth, of the thermoplastic fluoropolymer film's original thickness. For example, a thermoplastic fluoropolymer film originally having a thickness of 25.4 micrometers (1 mil) could produce a thin thermoplastic fluoropolymer layer having a thickness as low as about 2.5 micrometers (0.1 mil) or less after expansion of the porous PTFE sheet into the porous expanded PTFE article.

The means for heating the porous expanded PTFE sheet may be any means for heating commonly known in the art including, but not limited to, a convection heat source, a radiant heat source or a conduction heat source. The conduction heat source may be a heated surface such as a heated drum, roll, curved plate, or die. When a conduction heat source is used as the means for heating the coated porous expanded PTFE sheet, the uncoated surface of the sheet should be against the conduction heat source so to prevent sticking and melting of the melt-processible fluoropolymer layer upon the conduction heat source.

Thermoplastic fluoropolymers which are of utility as the melt-processible thermoplastic fluoropolymer layer have melt points of 342° C. or less. They include copolymer of tetrafluoroethylene and hexafluoropropylene (FEP), copolymer of tetrafluoroethylene and perfluoro(propylvinyl ether)(PFA), homopolymers of polychlorotrifluoroethylene (PCTFE) and its copolymers with TFE or VF2, ethylene-chlorotrifluoroethylene (ECTFE) copolymer, ethylene-tetrafluoroethylene (ETFE), polyvinylidene fluoride (PVDF), and polyvinylfluoride (PVF). Thermoplastic fluoropolymers are preferred as the melt-processible thermoplastic fluoropolymer since they are similar in nature to PTFE, having melt points near the lowest crystalline melt point of PTFE, and therefore are relatively high temperature thermoplastic polymers. Thermoplastic fluoropolymers are also relatively inert in nature and therefore exhibit resistance to degradation from many chemicals.

When applied under sufficient temperature and/or pressure, the melt-processible thermoplastic fluoropolymer film can act as an adhesive to adhere the high strength porous expanded PTFE film to the surfaces of other materials.

The expanded layered composite film 54 is wrapped on the core of elongated PTFE 52 so that the thin layer of melt-processible thermoplastic fluoropolymer contacts the core of elongated polytetrafluoroethylene 52. The composite film layer is then heated to cause the thin layer of melt-processible thermoplastic fluoropolymer to at least partially melt and adhere to the core of elongated PTFE core 52.

The PTFE film 54 may be wrapped on the core 52 in any desired manner. For instance, the film 54 can be wrapped on the core 52 in a helically so that the film forms a helical seam on the composite gasket material. Alternatively, the high strength film 54 may be wrapped on the core 52 in a longitudinal manner so that the film forms a longitudinal seam on the composite gasket material.

While the film 54 may be wrapped on the core 52 by hand, it is preferred that the wrapping is accomplished through the use of high-speed mechanical wrapping apparatus, such as a conventional tape-wrap machine used to wrap dielectric tape layers on conductors. One such machine is disclosed in U.S. Pat. No. 3,756,004 to Gore. The tape wrap machine applies a degree of back tension to the high strength film as it wraps it in a helical fashion around the core which applies a compressive force to the core and thereby somewhat densifies the core in the process. The degree of back tension applied to the high strength film may be varied so that the density of the core and final dimensions of the assembly may also be varied.

Densification (i.e. reduction in porosity) of the core results in no change to the tensile strength or tensile modulus properties which were developed in it by the expansion process, however, densification has a substantial effect on the flex and compressive characteristics of the material. By partially densifying the core and then constraining it by wrapping it with the high strength film, control over the amount of deformation required to densify it fully when in service can be exercised. In other words, a composite gasket material is produced such that a compressive load sufficient to provide an excellent seal can be applied to the composite gasket material with relatively little movement together of the sealing surfaces. Thus, the composite gasket material of the invention can provide a much thicker gasket that covers a much smaller sealing surface area than can be obtained from existing PTFE gasket materials having lower density or strength.

Alternatively, other means for densifying the expanded PTFE core can be used prior to the application of the high strength film to the PTFE core. Other means for densifying porous expanded polytetrafluoroethylene include compression by platen presses, grooved or flat calender rolls, and reducing or forming dies.

The high strength porous expanded PTFE film wrapped upon the elongated PTFE core imparts a substantially increased measure of circumferential strength and restraint to the PTFE core. The result is a composite gasket material with a reduced tendency to creep (i.e. a gasket material that has much greater resistance to becoming thinner and wider under steady compressive loads when compared to a PTFE gasket without the high strength wrap).

Alternatively, a second porous expanded PTFE film, which likewise may be coated with a melt-processible thermoplastic fluoropolymer as described above, may be wrapped upon the first high strength film. The second wrapped film can have tensile properties which provide additional strength and creep resistance to the composite gasket material or, alternatively, can have lower tensile strength and tensile modulus properties than the first wrapped film in order to enhance sealing surface conformability of the gasket material.

The following examples disclosing processes and products according to the present invention are illustrative only and are not intended to limit the scope of the present invention in any way.

TEST DESCRIPTIONS

Tensile Test

To determine the tensile properties of the high strength porous expanded polytetrafluoroethylene film, a 2.54 cm (1.0 inch) wide by 20.3 cm (8.0 inches) long sample of the film is obtained. Thickness of the film is determined with a snap micrometer gauge and width of the film is determined with a linear gauge. A constant rate-of-jaw-separation machine (Instron testing machine, Model 1122) is used to test samples to break. The gauge length of the specimen is 10.16 cm (4.0 inches). The strain rate employed is 2.54 cm/min (1.0 inch/min). Samples are tested to break. The tensile modulus at 2% extension and maximum stress are calculated and recorded as described in ASTM Standard Test Method D 882-91.

A population of five to eight samples is averaged to give each value listed herein.

Gasket Flow Test

Two sections of gasket material each 12.7 cm (5 inches) in length are obtained. The samples are mounted, in parallel alignment approximately 20 cm (8 inches) apart, between two 25.4 cm (10 inches) square rigid flat platens. An initial compressive load of 8.01 kN/linear cm (1800 lbf/linear in) is applied to the samples. The samples remain compressed for a period of 10 minutes at a temperature of 200° C. The compressive load is reduced by creep of the samples during the 10 minute compression period. No effort is made to maintain a constant load.

At the end of the compression period the samples are recovered and the distance around the perimeter ($P_f$) of the compressed sample is measured (in a direction perpendicular to the long axis of the sample). The $P_f$ measurement is compared to an initial perimeter measurement ($P_i$) of the sample taken in like manner prior to testing and the increase reported as Gasket Flow (GF) according to the formula:

$$GF, \text{percent}=(P_f-P_i/P_i)\times 100$$

EXAMPLE 1

A composite gasket material of the instant invention was produced in the following manner:

A 0.0127 mm (0.5 mil) FEP tape (50A available from E. I. dupont de Nemours & Co.) was laminated to a porous PTFE sheet through the introduction of enough heat to melt and attach the FEP sheet to the porous PTFE sheet as follows:

The combined sheets were first longitudinally stretched an amount 1.5:1 at a temperature of approximately 330° C. over a heated curved platen, and then further longitudinally stretched an amount 1.5:1 in a second heated zone at a temperature of approximately 340° C., thus forming a high strength composite film having a total amount of expansion of 2.25:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. The high strength composite film was wrapped so that ½ of the film was overlapped on the previously applied wrap.

Prior to wrapping the porous expanded polytetrafluoroethylene beading had a density of about 0.3 g/cc and an outside diameter of 17.8 mm (0.70 inch). Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 11.7 mm (0.46 inch).

The result was a composite gasket material of the instant invention.

Tensile properties of high strength composite film prepared as described in Example 1 were tested as described above. Tensile strength was 19.87 MPa (2882 psi) and 2% secant tensile modulus was 589.7 MPa (85520 psi). The composite gasket material of Example 1 was tested by the Gasket Flow Test described above and the results shown in Table 1.

EXAMPLE 2

A second example of the composite gasket material of the instant invention was produced in the following manner:

A 0.0254 mm (1.0 mil) FEP tape (100 A available from E. I. dupont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 10:1 in a second heated zone at a temperature of approximately 340° C., thus forming a high strength composite film having a total amount of expansion of about 38:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. The high strength composite film was wrapped so that ½ of the film was overlapped on the previously applied wrap.

Prior to wrapping the porous expanded polytetrafluoroethylene beading had a density of about 0.3 g/cc and an outside diameter of 17.8 mm (0.70 inch). Back tension was applied on the composite film so that when the wrapping of the beading was completed, the outside diameter of the wrapped beading was reduced to 13.7 mm (0.54 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 13.3 mm (0.52 inch).

The result was a composite gasket material of the instant invention.

Tensile properties of high strength composite film prepared as described in Example 2 were tested as described above. Tensile strength was 173.7 MPa (25200 psi) and 2% secant tensile modulus was 5838 MPa (846700 psi). The composite gasket material of Example 2 was tested by the Gasket Flow Test described above and the results shown in Table 1.

EXAMPLE 3

A third example of the composite gasket material of the instant invention was produced in the following manner:

A 0.0254 mm (1.0 mil) FEP tape (100 A available from E. I. dupont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 20:1 in a second heated zone at a temperature of approximately 340° C., thus forming a high strength composite film having a total amount of expansion of about 76:1. The composite film was subsequently heated at a temperature of 335° C. in a third heated zone at a stretch ratio of 1:1 so that no additional expansion occurred.

Subsequently, the composite film was slit lengthwise and helically wrapped upon a core of polytetrafluoroethylene beading that had not been previously subjected to an amorphous locking process. Prior to wrapping the porous expanded polytetrafluoroethylene beading had a density of about 0.3 g/cc and an initial outside diameter of 17.8 mm (0.7 inch).

The high strength porous expanded polytetrafluoroethylene film in the form of the composite film was wrapped so that ½ of the film was overlapped on the previously applied wrap. Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 11.9 mm (0.47 inch).

The result was a composite gasket material of the instant invention.

Tensile properties of high strength composite film prepared as described in Example 3 were tested as described above. Tensile strength was 212.7 MPa (30850 psi) and 2% secant tensile modulus was 7212 MPa (1046000 psi). The composite gasket material of Example 3 was tested by the Gasket Flow Test described above and the results shown in Table 1.

EXAMPLE 4

A fourth example of the composite gasket material of the instant invention was produced in the following manner:

A 0.0254 mm (1.0 mil) FEP tape (100 A available from E. I. dupont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 10:1 in a second heated zone at a temperature of approximately 340° C., thus forming a high strength composite film having a total amount of expansion of about 38:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. Prior to wrapping the porous expanded polytetrafluoroethylene beading had a density of about 0.3 g/cc and an initial outside diameter of 17.8 mm (0.7 inch).

The high strength porous expanded polytetrafluoroethylene film in the form of the composite film was wrapped so that ½ of the film was overlapped on the previously applied wrap. Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

The result was a composite gasket material of the instant invention.

Tensile properties of high strength composite film prepared as described in Example 4 were tested as described above. Tensile strength was 173.4 MPa (25200 psi) and 2% secant tensile modulus was 5838 MPa (846700 psi). The composite gasket material of Example 4 was tested by the Gasket Flow Test described above and the results shown in Table 1

COMPARATIVE EXAMPLE 1

For comparative purposes a section of commercially available wrapped porous polytetrafluoroethylene gasket material, Inertex ⅜" Valve Stem Packing, was obtained and tested as described in the examples above. A section of the tape wrapped around the core was unwound and samples were given the tensile test as described above except that the sample width was ½ inch. The results are also shown in Table 1.

TABLE 1

| Example | Film Tensile Strength (Mpa) | Film Modulus @ 2% strain (MPa) | Gasket Flow (%) |
| --- | --- | --- | --- |
| 1 | 19.9 | 590 | 70 |
| 2 | 173.4 | 5838 | 15 |
| 3 | 212.7 | 7212 | 29 |
| 4 | 173.4 | 5838 | 40 |
| Comp. Ex. 1 | 6.6 | 79 | 137 |

As should be evident from the above examples, the basic film wrapped material of the present invention provides a very distinct improvement over PTFE sealing materials and thus can be effectively utilized as a plate and frame sealing material. However, as has been mentioned, this material continues to have some deficiencies. One very limiting characteristic of this basic material is that it must be compressed approximately 3:1 in the plate and frame apparatus during assembly. Often times, the frame that the plates are compressed between is not long enough to fit all of the plates that are gasketed with this much thicker sealant, requiring burdensome compression in batches.

More debilitating, however, is the problem of plate shifting. There is significant "travel" or compression of the plates when the plate pack is assembled together with thicker wrapped PTFE sealant. If the plate and frame device does not have a suitable guide bar to provide "optimal" packing (i.e. rigidly fixed to prevent sliding or bending of the plates), the plates sealed with the basic wrapped gasket material are prone to shifting and sliding. This is further aggravated by the high compressive forces that are required to adequately compress the gasket If even one plate shifts out of alignment, a leak will form. As a result, use of the basic wrapped gasket material, installed in this fashion, is limited to those applications where risk of debilitating plate movement is minimal. Examples of such applications include: plate and frame apparatus with thicker plates; "optimal" plate and frame apparatus with suitable guide bar designs; and plate and frame apparatus with tighter control over plate movement (e.g. those with smaller plates, less than 100 plates, and/or sufficient bolting capacity).

Figure 4:
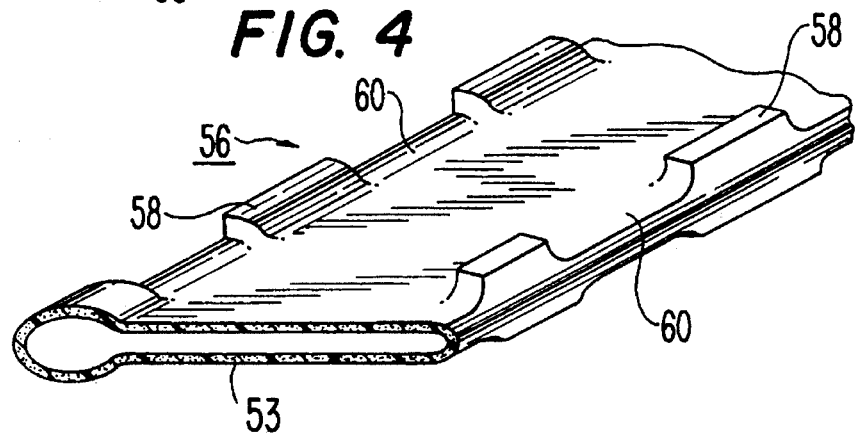
FIG. 4 is a three-quarter isometric view of a fully compressed gasket material of the present invention.

In order to address these limitations, a further embodiment of the present invention is shown in FIG. 4. As has been noted, even with a high strength film wrap, the gasket material of the present invention undergoes a significant decrease in thickness before reaching sufficient density and compression to assure creep stability. Once formed in place, the contours of the gasket will achieve a pattern complementary to the texture of the plate to which it is attached. One such pattern is shown on the gasket 56 in FIG. 4, comprising a series of projections 58 and indentations 60 corresponding to the corrugated texture of a plate to which the gasket was attached. From a typical starting density of 1.0 to 1.3 g/cc, the fully compressed gasket normally achieves a density of about 1.8–1.9 g/cc.

It has been determined that installation of the gasket material of the present invention can be greatly enhanced by pre-compressing the gasket material prior to installation. In its simplest form, the gasket material is mounted on a plate or other mold containing the desired texture and then compressed under pressure to impart the desired contours to the material, such as is shown in FIG. 4. Once formed in this manner, the gasket material and plate can then be installed, or the material may then be removed from the mold and installed on a similarly textured plate.

One method to perform this procedure employs a hydraulic press capable of generating a compressive force of about 35 to 50 tons or more. The gasket material is installed on one plate, or between two plates, in a conventional manner and then compressed to impart at least an initial reduced thickness to the material. Spacer bars or similar stops should be provided on either side of the plate to prevent the press from over compressing the material or damaging the plate/mold. For a gasket material with an expanded PTFE core and a high strength film wrap of PTFE, a typical compression procedure comprises applying approximately 1,200 lbs per linear inch of force to the sealant for a period of approximately 5 seconds, with or without heat. Less force is required if heat is applied to the gasket material, such as through use of a heat mold plate. Generally, the force applied to a core of expanded PTFE wrapped with an expanded PTFE film should be at least 500 to 800 lbs per linear inch.

Ideally the gasket material will be compressed enough to decrease significantly the amount of travel experienced during installation and to provide a "footprint" of the adjoining plate on to the gasket to help prevent shifting of the plates. However, densification should not be so great that further compression and fitting of the gasket cannot occur during actual installation. As such, a density of about 1.6 to 1.8 g/cc should be sought.

Figure 5:
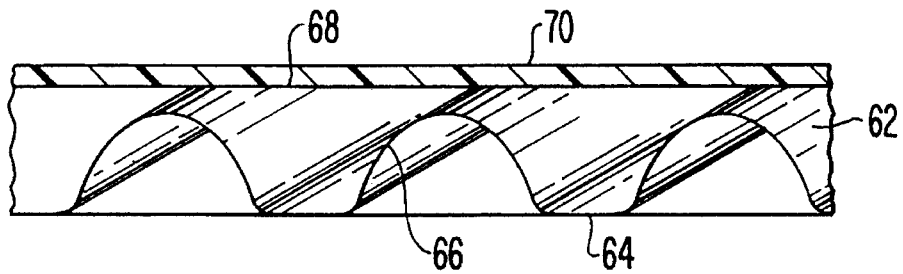
FIG. 5 is a side elevational view of another embodiment of a gasket material of the present invention, pre-compressed and provided with a plate pattern on its bottom side and a conformable sealing layer on its top side.

Shown in FIG. 5 is a cross section of a gasket material 62 which has been partially compressed in this manner. In this case, the gasket 62 has been compressed on its lower face 64 to impart a series of indentations 66 to the gasket corresponding to corrugated texturing of a mounting plate. The gasket has not been fully densified and in this case its top surface 68 remains planar, allowing for further customized fitting once installed. This material has been pre-compressed to approximately 50% of its original thickness.

To create an even better seal once installed, the embodiment of FIG. 5 also includes a conformable sealing layer 70 which is installed on the gasket 62 after pre-compression. Preferably, the conformable sealing layer 70 comprises a strip of low density, expanded PTFE sealing tape with thickness of about 0.5 to 1.0 mm. A suitable tape including a self-adhesive layer on one side, permitting quick and easy installation, is commercially available from W. L. Gore & Associates, Inc., of Elkton, Md., under the trademark GORE-TEX® Gasket Tape. This tape becomes a conformable member of the composite sealant once installed and fully compressed in place. At this point, there is provided a dense base material which is adequately seated against a lower plate to which it is pre-molded, and a low density (e.g. 0.4 g/cc) top sealing layer which seats easily into a complementary plate during installation.

Figure 6:
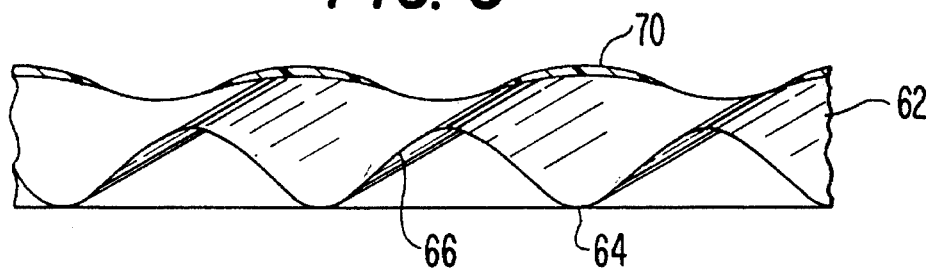
FIG. 6 is a side elevational view of the embodiment of gasket material shown in FIG. 5 following full compression in a plate and frame heat exchanger.

FIG. 6 is illustrative of the composite gasket 62 of FIG. 5 once installed in place. As can be seen, the sealing layer 70 compresses and densifies in close contact with the gasket material 62, while filling in slight differences between the plates (e.g. the raised areas of the sealing layer 70 shown in FIG. 6). The sealing layer 70 also creates a seal between a dense base gasket material and an adjoining plate with far less force than would be required without such a layer.

The function of the gasket tape strip on the slightly compressed gasket is at least threefold:

1. It allows a seal to be created with much lower bolt force such that hot fluids can be held within the plate and frame apparatus to soften the gasket before final compression of the final seal with the compression bolts. Much higher bolt forces are required to effect this initial seal without the gasket tape strip, and, thus, would promote plate shifting. Furthermore, some plate and frame devices may not capable of achieving enough sealing pressure without the aid of a conformable layer;

2. It allows the adjoining plate to imprint its "footprint" into the sealant at low bolt forces, thus, again minimizing the potential for plate shifting; and 3. It allows greater conformability of the seal assembly.

Assembly of this embodiment of the present invention in "optimum" plate and frame apparatus, which are not prone to plate shifting, involves uniform tightening of the compression bolts to draw the unit together slowly and compress each gasket between the plates approximately 0.09". The sealant is seated against the plates and densified to required levels to insure long-term mechanical reliability.

Assembly of the gasket in "non-optimum" plate and frame apparatus (i.e. those that are prone to plate shifting) involves uniform tightening of the compression bolts to compress the plates toward each other approximately 0.02" to initially seat the sealant. Since much less force is required to compress each gasket 0.020", shifting problems are minimized. At this point, the plates are seated against the gaskets, yet the gasket core still requires further compression to insure long-term mechanical reliability. To prevent plate shifting during this subsequent compression, hot fluid should be fed into the plate and frame apparatus to soften the sealant. The bolts are then uniformly tightened until the gasket is adequately compressed. The bolt force required to compress the gaskets the final 0.070" is much lower with the sealant warm than when at room temperature.

Figure 7:
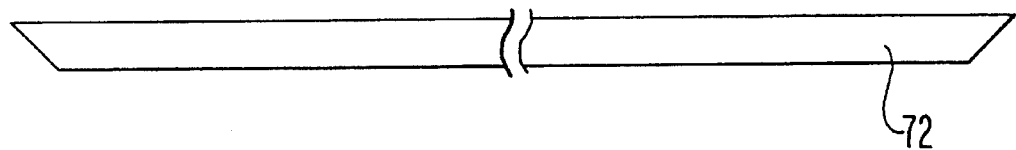
FIG. 7 is a top plan view of a cord of gasket material of the present invention cut to correct length for installation on a plate.

In all forms of the present invention the gasket material may be provided in a variety of forms to solve specific sealing needs. FIG. 7 illustrates a cord gasket material 72, with typical dimensions of 12.7 mm wide, 7.6 mm thick. The cord gasket material can be provided in continuous lengths, such as on a spool, to allow it to be cut to size for particular installation demands.

Figure 8:
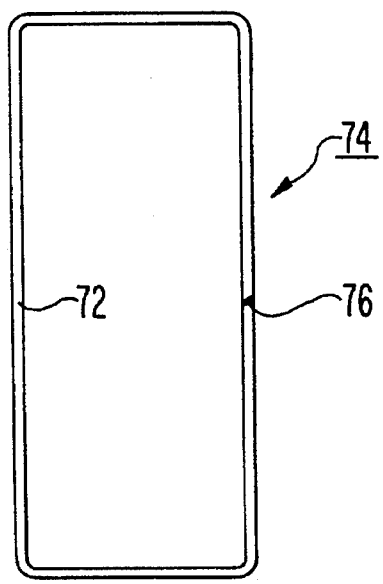
FIG. 8 is a top plan view of a cord of gasket material of the present invention joined into a loop for installation on a plate.

While the cord 72 can be cut to provide specialized sealing, such as around ports 28a, 30a in the plate of FIG. 2, for most plate and frame uses the cord gasket material 72 is joined to itself to form a continuous loop 74 like that shown in FIG. 8. The joint 76 is then connected together by simply splicing the ends. One such splicing technique comprises cutting the ends with a 1 inch minimum scive cut, joining the ends together, wrapping the joined ends with a tape (which ideally should be similar or identical to the film wrapping the gasket material), and then heat setting the tape in place with a mold press.

Figure 9:
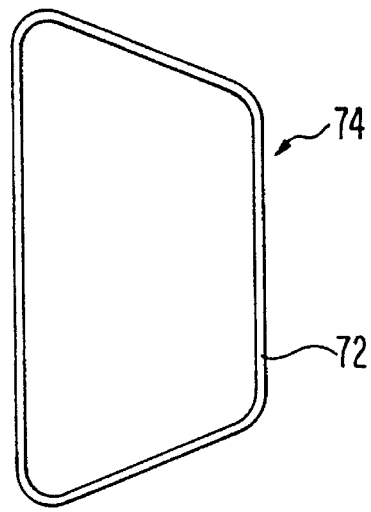
FIG. 9 is a top plan view of a cord of gasket material of the present invention joined into a loop and shaped into correct contours for installation on a plate.

The flexibility of the PTFE core and the resistance of the gasket material to cold flow allows the loop 74 of gasket material to be shaped and retained in various positions for installation in a plate and frame apparatus. One such shaped position is shown in FIG. 9.

The gasket material of the present invention provides significant improvements in the durability, longevity, chemical and thermal resistance, and ease in installation of gasket material for use in plate and frame devices. Moreover, the nature of expanded PTFE allows the material to release very easily and intact from the plate, even after it has been installed under heavy pressure for a long period of time.

For most applications, the gasket material is removed by merely prying the material away from the plate and pulling the rest of the material intact away from the plate. Residue adhesive, if employed, can be stripped by removing an adhesive carrier sheet and/or by wiping with a suitable solvent. As a result of the simplicity of this procedure, plates can be almost instantaneously cleaned of old gasket material and adhesive in a matter of minutes, compared to an average of over an hour of clean up time per plate with conventional gasket materials.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A multiple layered plate and frame apparatus including a gasket, said gasket comprises:

a core of elongated polytetrafluoroethylene (PTFE);

means to constrain the core from lateral flow when placed under compressive pressure to establish and maintain a seal between multiple plates; the means comprising a tight film wrap around the PTFE core of sufficient tensile strength to limit creep of the PTFE core when the gasket is placed under pressure.

2. The gasket material of claim 1 wherein the gasket material is wrapped in a film of expanded PTFE.

3. The gasket material of claim 2 wherein the expanded PTFE film is coated with a layer of melt-processible thermoplastic fluoropolymer.

4. The gasket material of claim 1 wherein the gasket material is pre-compressed prior to installation between the plates.

5. The gasket material of claim 4 wherein the plates include a textured surface at least in the area where the gaskets are mounted; and the gasket material includes a first and second sealing surface, with a pattern on at least one of the sealing surfaces corresponding to the textured surface of the plates to allow the gasket to be readily mated therewith.

6. The gasket of claim 5 wherein the gasket material includes a pattern on both of its sealing surfaces corresponding to the textured surface of the plates.

7. The gasket material of claim 5 wherein the gasket material includes a pattern on one sealing surface and a conformable sealing layer mounted on the opposite sealing surface, the conformable sealing layer forming a tight seal against a plate when compressed in place.

8. The gasket material of claim 1 wherein the gasket material comprises a cord of material which can be cut to size and installed on a plate.

9. The gasket material of claim 1 wherein the gasket material comprises a pre-shaped pattern adapted to be directly installed on a plate.

10. The gasket material of claim 1 wherein the gasket material includes an adhesive layer on at least one side to assist in retaining the gasket material in place on a plate.

11. The gasket material of claim 10 wherein the adhesive layer comprises a pressure sensitive adhesive.

12. The gasket material of claim 11 wherein the pressure sensitive adhesive is applied to a carrier sheet.

13. The gasket material of claim 1 wherein
the elongated PTFE core comprises an expanded PTFE; and
the film comprises expanded PTFE coated in a melt processible thermoplastic fluoropolymer.

14. The gasket material of claim 13 wherein the gasket material is pre-compressed prior to installation between the plates.

15. The gasket material of claim 13 wherein the gasket material readily releases from the plate after it has been fully compressed against it.

16. A process for sealing a multiple layered plate and frame apparatus, which process comprises:
providing a gasket material comprising a core of elongated polytetrafluoroethylene (PTFE) and means to constrain the core from lateral flow when the gasket is placed under compressive pressure, said means comprising a tightly wrapped film of sufficient tensile strength to limit creep of the PTFE core when the gasket is placed under pressure;
attaching the gasket material to a plate of the plate and frame apparatus;
stacking multiple plates of the plate and frame apparatus together in series, each plate separated from the next by the gasket material;
mounting the stacked plates in the frame and applying pressure to compress the plates together, forming a fluid tight seal between the gasket material and the plates.

17. The process of claim 16 that further comprises providing a gasket material comprising a core of expanded PTFE wrapped in a film of expanded PTFE coated with a fluoropolymer.

18. The process of claim 17 that further comprises releasing the gasket material from the plates after compression between the plates by prying the material loose, the gasket material separating intact from the plates.

19. The process of claim 16 that further comprises:
employing plates that include surface texturing at least in the area where the gasket material is mounted;
providing gasket material that includes a first and second sealing surface and a pattern on at least one of the sealing surfaces corresponding to the textured surface of the plates;
mounting the pattern of the sealing surface in mated abutment with the textured surface of the plate.

20. The process of claim 19 that further comprises pre-compressing the gasket material prior to installing it between the plates.

21. The process of claim 20 that further comprises pre-compressing the gasket material by subjecting it to compressive force of at least 500 lbs per linear inch.

22. The process of claim 20 that further comprises forming the pattern in the gasket material through the following steps:
providing a mold containing the texture of the plate;
placing the gasket material on the mold prior to pre-compressing it;
subjecting the gasket material to a compressive force to impart a pattern from the mold into the gasket material complementary to the texture of the plate.

23. The process of claim 22 that further comprises employing as a mold a plate from the plate and frame apparatus.

24. The process of claim 20 that further comprises providing on at least one surface of the gasket material a conformable tape, the tape providing an improved seal between the gasket material and the plate when compressed between the plates.

25. A multiple layered plate and frame apparatus including a gasket, the gasket comprises:
a core of elongated polytetrafluoroethylene (PTFE);
means to constrain the core from lateral flow when placed under compressive pressure to establish and maintain a seal between multiple plates, the means comprising a tight film wrap around the PTFE core of sufficient tensile strength to limit creep of the PTFE core when the gasket is placed under pressure; and
wherein the gasket material is pre-compressed, requiring minimal travel of the plates during installation.

26. The gasket material of claim 25 wherein
the plates include a textured surface at least in the area where the gaskets are mounted; and
the gasket material includes a first and second sealing surface, with a pattern on at least one of the sealing surfaces corresponding to the textured surface of the plates to allow the gasket to be readily mated therewith.

27. The gasket of claim 26 wherein the gasket material includes a pattern on both of its sealing surfaces corresponding to the textured surface of the plates.

28. The gasket material of claim 26 wherein the gasket material includes a pattern on one sealing surface and a conformable sealing layer mounted on the opposite sealing surface, the conformable sealing layer forming a tight seal against a plate when compressed in place.

29. The gasket material of claim 25 wherein the gasket material comprises a pre-shaped pattern adapted to be directly installed on a plate.

30. The gasket material of claim 25 wherein the gasket material includes an adhesive layer on at least one side to assist in retaining the gasket material in place on a plate.

31. The gasket material of claim 30 wherein the adhesive layer comprises a releasable coating of pressure sensitive adhesive.

32. The gasket material of claim 25 wherein
the elongated PTFE core comprises an expanded PTFE; and
the film comprises expanded PTFE coated in a melt processible thermoplastic fluoropolymer.

33. The gasket material of claim 32 wherein the gasket material readily releases from the plate after it has been fully compressed against it.

34. A process for sealing a multiple layered plate and frame apparatus, which process comprises:

provides a gasket material comprising a core of elongated polytetrafluoroethylene (PTFE) and means to constrain the core from lateral flow when placed under compressive pressure, said means comprising a tightly wrapped film of sufficient tensile strength to limit creep of the PTFE core when the gasket is placed under pressure;

compressing the gasket material;

attaching the compressed gasket material to a plate of the plate and frame apparatus;

stacking multiple plates of the plate and frame apparatus together in series, each plate separated from the next by the gasket material;

mounting the stacked plates in the frame and applying pressure to compress the plates together, forming a fluid tight seal between the gasket material and the plates.

35. The process of claim 34 that further comprises providing a gasket material comprising a core of expanded PTFE wrapped in a film of expanded PTFE coated with a fluoropolymer.

36. The process of claim 35 that further comprises releasing the gasket material from the plates after compression therebetween by prying the material loose, the gasket material separating intact from the plates.

37. The process of claim 34 that further comprises:

employing plates that include surface texturing at least in the area where the gasket material is mounted;

providing gasket material that includes a first and second sealing surface and a pattern on at least one of the sealing surfaces corresponding to the textured surface of the plates;

mounting the pattern of the sealing surface in mated abutment with the textured surface of the plate.

38. The process of claim 34 that further comprises compressing the gasket material by subjecting it to compressive force of at least 500 lbs per linear inch.

39. The process of claim 34 that further comprises forming the pattern in the gasket material through the following steps:

providing a mold containing the texture of the plate;

placing the gasket material on the mold prior to pre-compressing it;

subjecting the gasket material to a compressive force to impart a pattern from the mold into the gasket material complementary to the texture of the plate.

40. The process of claim 37 that further comprises providing on at least one surface of the gasket material a conformable tape, the tape providing an improved seal between the gasket material and the plate when compressed between the plates.

* * * * *